United States Patent
Tsai et al.

(10) Patent No.: US 12,024,287 B2
(45) Date of Patent: Jul. 2, 2024

(54) TRUNCATED FLAP SUPPORT FAIRINGS WITH ACTIVE FLOW CONTROL SYSTEMS FOR AIRCRAFT AND RELATED METHODS

(71) Applicant: The Boeing Company, Chicago, IL (US)

(72) Inventors: Kevin Tsai, Seattle, WA (US); Jacob Makena Wagner, Mountain View, CA (US)

(73) Assignee: The Boeing Company, Arlington, VA (US)

( * ) Notice: Subject to any disclaimer, the term of this patent is extended or adjusted under 35 U.S.C. 154(b) by 97 days.

(21) Appl. No.: 17/693,006

(22) Filed: Mar. 11, 2022

(65) Prior Publication Data

US 2022/0396351 A1 Dec. 15, 2022

Related U.S. Application Data

(60) Provisional application No. 63/208,754, filed on Jun. 9, 2021.

(51) Int. Cl.
*B64C 7/00* (2006.01)
*B64C 9/02* (2006.01)
*B64C 9/04* (2006.01)
*B64C 21/04* (2023.01)

(52) U.S. Cl.
CPC ............. *B64C 7/00* (2013.01); *B64C 9/02* (2013.01); *B64C 9/04* (2013.01); *B64C 21/04* (2013.01)

(58) Field of Classification Search
CPC .. B64C 21/04; B64C 9/02; B64C 9/04; B64C 7/00; B64C 7/02; B64D 29/03
See application file for complete search history.

(56) References Cited

U.S. PATENT DOCUMENTS

| | | | | |
|---|---|---|---|---|
| 3,669,386 A | * | 6/1972 | Jacobs | B64C 9/38 244/207 |
| 3,801,048 A | * | 4/1974 | Riccius | B64C 21/025 244/209 |
| 5,207,400 A | * | 5/1993 | Jennings | B64C 9/16 244/216 |

(Continued)

FOREIGN PATENT DOCUMENTS

GB 2454725 A * 5/2009 ............. B64C 23/00

OTHER PUBLICATIONS

Diebler et al., "A Ground-Based Research Vehicle for Base Drag Studies at Subsonic Speeds," NASA Dryden Flight Research Center, Edwards, California, Nov. 2002, 19 pages.

(Continued)

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

Truncated flap support fairings with active flow control system for aircraft and related methods are disclosed herein. An example aircraft includes a wing having a fixed wing portion, a flap moveably coupled to the fixed wing portion, a flap support fairing coupled to a bottom of the flap, the flap support fairing having an aft end, and an active flow control system including a nozzle. The nozzle is to eject high velocity air in a streamwise direction from the aft end of the flap support fairing.

18 Claims, 8 Drawing Sheets

(56) References Cited

U.S. PATENT DOCUMENTS

| | | | |
|---|---|---|---|
| 2012/0068011 A1* | 3/2012 | Thomas | B64D 27/26 244/1 N |
| 2012/0211599 A1* | 8/2012 | Morvant | B64C 7/02 244/1 N |
| 2014/0151510 A1 | 6/2014 | Schroeder et al. | |
| 2017/0088276 A1* | 3/2017 | Gruber | B64D 27/26 |
| 2019/0248475 A1* | 8/2019 | Shmilovich | G05D 7/0664 |

OTHER PUBLICATIONS

Yang et al., "Large Eddy Simulation of Base Drag Reduction with Jet Boat-Tail Passive Flow Control," Elsevier Ltd., 7th International Conference on Fluid Mechanics, ICFM7, pp. 150-157, 2015, 8 pages.

* cited by examiner

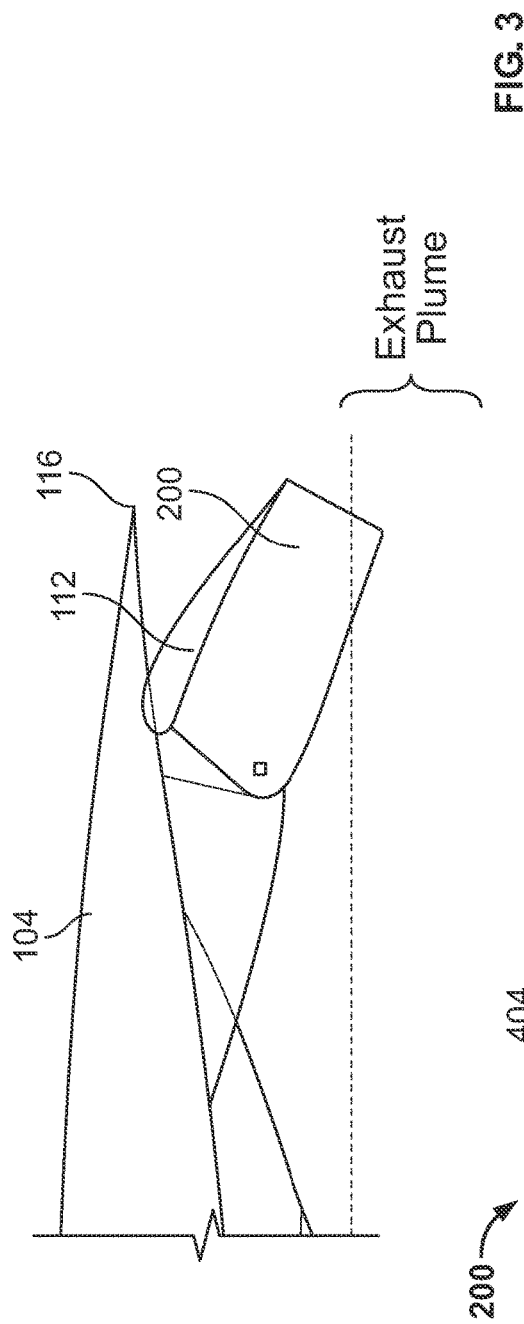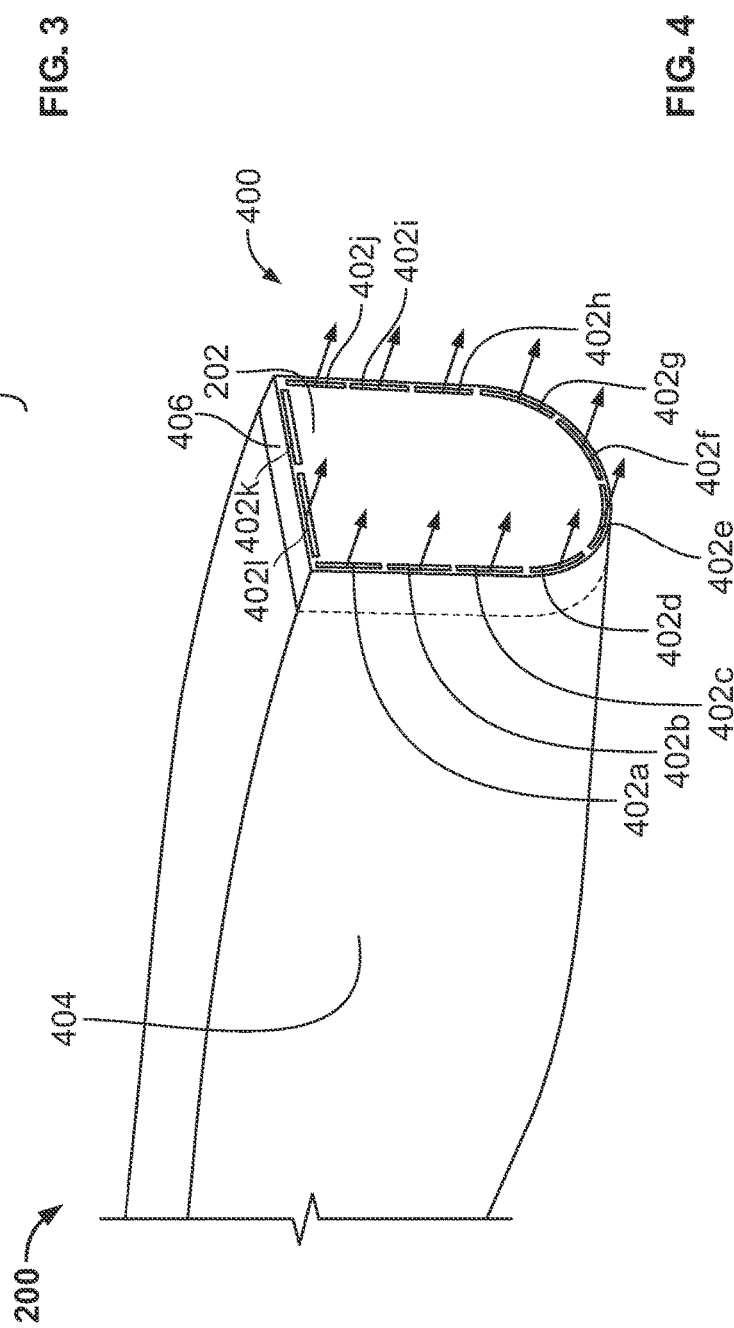

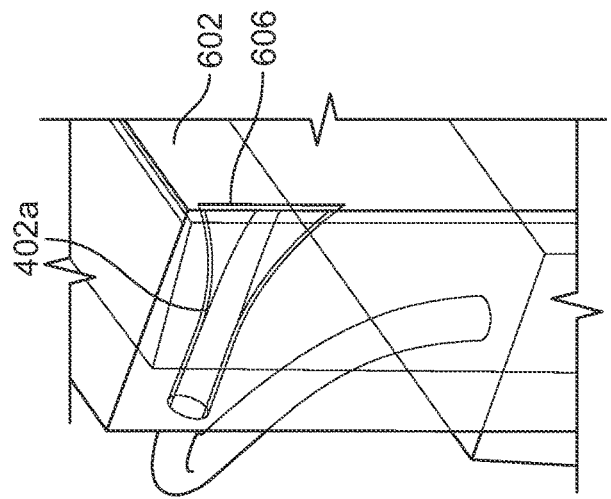
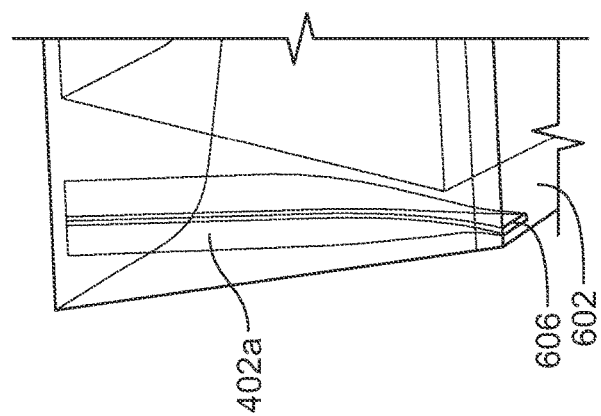
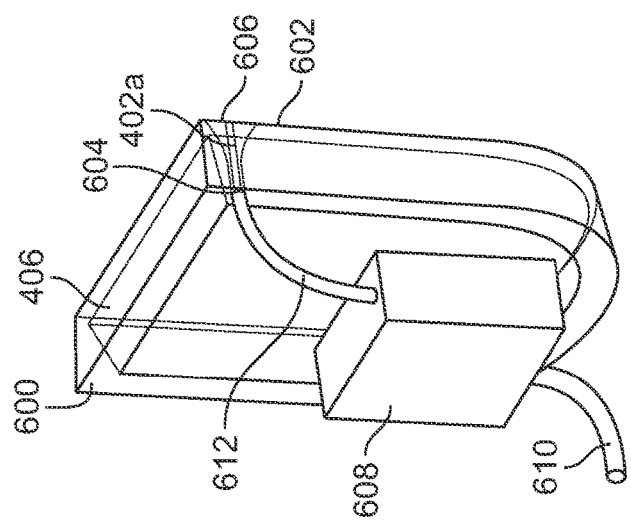

TRUNCATED FLAP SUPPORT FAIRINGS WITH ACTIVE FLOW CONTROL SYSTEMS FOR AIRCRAFT AND RELATED METHODS

RELATED APPLICATION

This patent claims the benefit under 35 U.S.C. § 119(e) to U.S. Provisional Application No. 63/208,754, titled "Truncated Flap Support Fairings With Active Flow Control Systems For Aircraft and Related Methods," filed Jun. 9, 2021, which is hereby incorporated by this reference in its entirety.

FIELD OF THE DISCLOSURE

This disclosure relates generally to aircraft and, more particularly, to truncated flap support for fairings with active flow control systems for aircraft and related methods.

BACKGROUND

Many aircraft employ high lift devices, sometimes referred to as auxiliary airfoils or movable control surfaces, along the leading and trailing edges of the wings. For example, flaps are a common type of high lift device that are movably coupled along the trailing edge of a wing. The flaps may be moved (e.g., tilted) downward from the trailing edge of the wing to change the shape of the wing to generate more or less lift. The flaps are often deployed during takeoff and landing, for instance, to generate more lift at slower speeds. Aircraft typically have one or more flap supports, covered by flap support fairings, to help support each of the flaps on the wing. The flap support fairings extend outwardly beyond the trailing edges of the flaps and are aerodynamically shaped to reduce drag.

SUMMARY

An example aircraft disclosed herein includes a wing having a fixed wing portion, a flap moveably coupled to the fixed wing portion, and a flap support fairing coupled to a bottom of the flap. The flap support fairing has an aft end. The example aircraft also includes an active flow control system including a nozzle. The nozzle is to eject high velocity air in a streamwise direction from the aft end of the flap support fairing.

An example flap support fairing for an aircraft is disclosed herein. The example the flap support fairing includes a side wall and a bulkhead coupled to the side wall. The bulkhead defines an aft end of the flap support fairing. The example flap support fairing also includes a nozzle coupled to the bulkhead. The nozzle is to eject high velocity air in a streamwise direction from the bulkhead.

An example method disclosed herein includes determining an aircraft is in a cruise segment of flight and, in response to determining the aircraft in the cruise segment of the flight, opening a valve to supply high pressure air to a nozzle. The nozzle is to eject high velocity air in a streamwise direction from an aft end of a flap support fairing to reduce drag.

BRIEF DESCRIPTION OF THE DRAWINGS

FIG. 3 is a side view of the example flap of FIG. 2 in a deployed position.

FIG. 4 shows an aft end of the example flap support fairing of FIG. 2 and example nozzles of an example active flow control system implemented in the example flap support fairing.

FIGS. 6A-6C are different views of an example bulkhead that defines the aft end of the example flap support fairing of FIG. 2.

Figure 1:
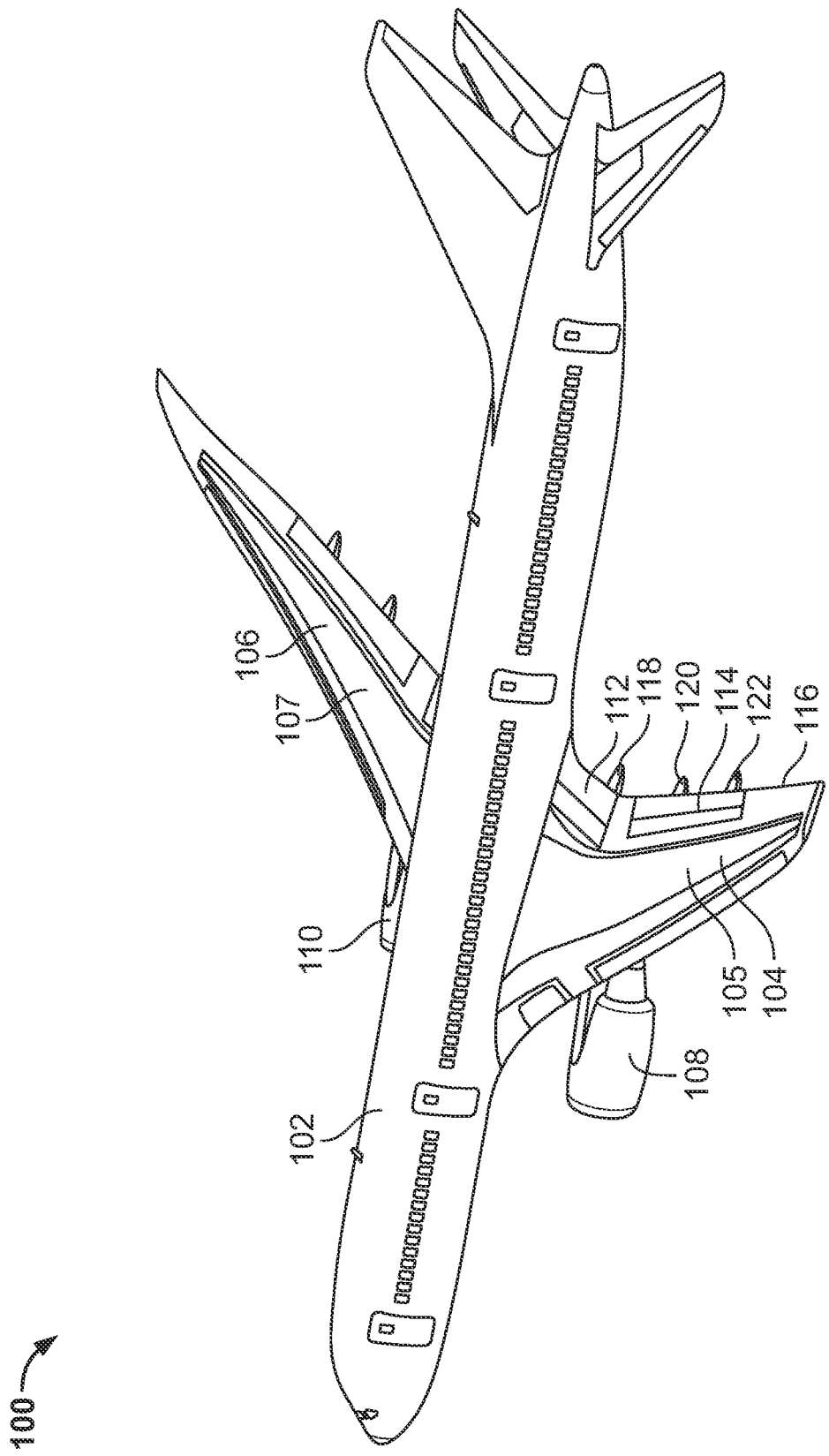
FIG. 1 illustrates an example aircraft in which the examples disclosed herein can be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Many aircraft employ one or more high-lift devices along the leading and/or trailing edges of the wings. Flaps are a common type of high-lift device that are movably mounted along a trailing edge of a wing. A flap, for instance, is movable between a stowed position in which the flap is in line with the wing and a deployed position in which the flap is moved (and/or angled) downward from the trailing edge of the wing. Aircraft may include one or multiple flaps along the trailing edge of a wing. When deployed, the flap(s) change(s) the chord length and camber of the wing, which can be used to generate more or less drag and lift. As such, flaps are typically deployed during takeoff and landing.

Flap supports are commonly employed on the aircraft wings to help support the flaps along the trailing edge of the wing. The flap supports may be part of the actuation assembly that is used to deploy the flaps, for instance. Known flap supports include a fixed portion, referred to as a fixed side support or support beam, coupled to the wing (e.g., to a bottom of the wing) and a movable portion, referred to as moveable side support, that is coupled to a bottom side of the flap and moves with the flap when the flap is deployed or retracted. The moveable side support is rotatably coupled to the fixed side support, which enables the moveable side support to be tilted down when the flap is moved downward from the trailing edge of the wing.

Flap supports are commonly covered with flap support fairings (sometimes referred to anti-shock bodies, Withcomb bodies, Kuchemann carrots, or canoe fairings) that provide an aerodynamic casing that covers the flap support (and the portion of the actuation assembly) and reduces drag that may otherwise be caused thereby. The flap support fairings may include a fixed portion that is coupled to the bottom side of the wing and covers the fixed side support of the flap support and a moveable portion that is coupled to the bottom of the flap and covers the moveable side support of the flap support. The moveable portion of the flap support fairing extends beyond the trailing edge of the flap and the wing, and tapers, to reduce turbulence and drag.

It is often desired to position a flap support in line with an engine on the wing because this location is often the structurally optimal for supporting the flap and provides the most aerodynamic configuration (instead of having two structures that are offset from each other). However, when the flap and the flap support fairing are moved downward, the flap support fairing is disposed directly in line with the engine plume, i.e., the hot exhaust gas exiting the engine. As result, the flap support fairing experiences a high amount of unwanted heat and vibration. As such, the flap support fairings are constructed of higher gauge material to handle the higher loads, which increases weight and costs. Other aircraft have moved the flap support (and the flap support fairing) further inboard or outboard from this location to avoid the engine plume. However, this can have undesirable effects on the flap loads and deflections. For instance, supporting the flap further outboard can lead to increased bending of the flap, which requires the flap to be made using thicker skin and spar materials and, thus, increases the costs and weight of the aircraft. On the other hand, supporting the flap further inboard sometimes requires an additional flap support to help share the load. However, because of the locations of the flap supports, one of the flap supports experiences a heavier load than the other, thereby requiring thicker material for the flap support fairing and increased driving power for the flap support fairing. Further, this unbalanced load may not be desirable for fail safety concerns because one of the flap supports is not sharing a comparable amount of the load.

Disclosed herein are example flap support fairings that are truncated or shortened compared to known flap support fairings. In some examples, the ends of the flap support fairings are aligned with (or close to) the trailing edge of the flap, instead of extending significantly beyond the trailing edge of the flap as seen in known flap support fairings. As such, when the flap is deployed, the shortened flap support fairing does not extend (or does not extending much) into the plume of the exhaust. As a result, the example flap support fairing (and the flap support disposed therein) can be disposed in line (or substantially in line) with an engine on the wing of the aircraft without subjecting the flap support fairing to the extreme temperature and vibrational forces from the engine plume. Thus, the example flap support fairing can be constructed with lighter, less expensive materials because of the reduced loads, heat, and vibrations experienced by the flap support fairing. Further, as mentioned above, it is often advantageous to locate the flap support and associated flap support fairing in line with the engine because it produces a more aerodynamic configuration that reduces drag during cruise. Also, the fixed side support of the flap support and the flap support fairing can be coupled to and/or otherwise integrated with the engine pylon, which is more structurally efficient than having separate structures that are spaced apart spanwise from each other along the wing. Further, disposing the flap support (and the associated flap support fairing) in line with the engine is often a central location on the flap and, thus, disposing the flap support in this location helps decrease bending of the flap. Therefore, unlike known aircraft designs that have the flap supports disposed further inboard or outboard of the engine and need thicker skin and spar material, the example flap support fairing can be constructed of thinner less expensive material and can be positioned in the advantageous position in line with the engine. Thus, example flap support fairings result in decreased costs and weight associated with the aircraft, thereby improving fuel efficiency.

Also disclosed herein are example active flow control systems that be used to reduce drag caused by the truncated flap support fairing. In particular, because the flap support fairing is truncated or shortened, the flap support fairing may induce more turbulence and, thus, more drag. In some examples disclosed herein, the active flow control system includes one or more nozzles (e.g., jets, outlets, vents, etc.) that eject high velocity air in a streamwise direction from the aft end of the flap support fairing. As used herein, the streamwise direction generally refers to the direction the external air flows across the surfaces of the aircraft while moving (e.g., during flight, take-off, landing, etc.). In some examples, the one or more nozzles are arranged along a perimeter of the aft end of the flap support fairing. The one or more nozzles can eject a continuous stream of high velocity air. The high velocity air imparts momentum into the wake or area behind the aft end of the flap support fairing, which would otherwise have strongly separated, low-velocity flow, causing high amounts of aerodynamic drag. Therefore, by energizing this area and reducing the low pressure area behind the aft end, the airflow along the flap support fairing remains more streamlined and, thus, decreases the separation or detachment of the airflow behind the flap support fairing. This reduces drag caused by the truncated flap support fairing and, thus, improves fuel efficiency of the aircraft.

FIG. 1 illustrates an example aircraft 100 in which the examples disclosed herein may be implemented. In the illustrated example, the aircraft 100 includes a fuselage 102, a first wing 104 coupled to the fuselage 102, and a second wing 106 coupled to the fuselage 102. The aircraft 100 also includes a first engine 108 carried by (e.g., coupled to) the first wing 104 and a second engine 110 carried by (e.g., coupled to) the second wing 106. In other examples, the aircraft 100 may have multiple engines coupled to each of the first and second wings 104, 106 and/or disposed in other locations on the aircraft 100 (e.g., coupled to the fuselage 102, coupled to a tail section of the aircraft 100, etc.).

The first and second wings 104, 106 have respective fixed wing portions 105, 107. The first and second wings 104, 106 may have one or more control surfaces such as high lift devices (e.g., auxiliary airfoils) that are located along the leading and/or trailing edges of the fixed wing portions 105, 107 of the first and second wings 104, 106. Such high lift devices may be displaced or extended from the leading and/or trailing edges of the first and second wings 104, 106 to change the aerodynamic lift of the aircraft 100 and are typically used during takeoff and landing. For example, in FIG. 1, the first wing 104 includes a first flap 112 (an inboard flap) and a second flap 114 (an outboard flap) that are moveably coupled to the fixed wing portion 105 of the first wing 104. The first and second flaps 112, 114 are disposed along a trailing edge 116 the fixed wing portion 105. The first and second flaps 112, 114 may be moved downward relative to the trailing edge 116 of the first wing 104 to change the shape of the first wing 104, which is advantageous during takeoff and landing, for example. While in this example the first wing 104 includes two flaps, in other examples, the first wing 104 may include more or fewer flaps (e.g., only the first flap 112, only the second flap 114, three flaps, four flaps, etc.). Similarly, the second wing 106 may include one or more flaps. It is understood that any disclosure relating to the first wing 104 can likewise be applied to the second wing 106. Thus, to avoid redundancy, a description of the second wing 106 is not provided herein.

In the illustrated example of FIG. 1, the first and second flaps 112, 114 are in a stowed or retracted position. During cruise, for example, the first and second flaps 112, 114 are stowed in this position, which is generally more aerodynamic and fuel efficient. During takeoff and landing, for example, the first and second flaps 112, 114 can be moved and/or rotated downward to a deployed or extended position, which increases the chord length of the first wing 104 to generate more lift.

To help support the first and second flaps 112, 114, the aircraft 100 may include a plurality of flap supports, which are covered by flap support fairings. In the illustrated example of FIG. 1, the aircraft 100 includes three flap supports covered by three flap support fairings including: a first flap support fairing 118, a second flap support fairing 120, and a third flap support fairing 122. The first flap support fairing 118 (and the flap support therein) is associated with the first flap 112, and the second and third flap support fairings 120, 122 (and the respective flap supports therein) are associated with the second flap 114. However, in other examples, the first and second flaps 112, 114 may include more or fewer flap supports (with flap support fairings) and/or the flap supports (and flap support fairings) may be disposed in other locations. The flap support fairings 118, 120, 122 shown in FIG. 1 are known types of flap support fairings with elongated tapering profiles that extend beyond the trailing edge 116 of the first wing 104.

The first flap support fairing 118 is coupled to the bottom of the first flap 112 and, thus, moves with the with the first flap 112 between the stowed position and the deployed position. As shown in FIG. 1, the first flap support fairing 118 has a tapered profile that extends aft of the trailing edge 116 of the first wing 104 and the trailing edge of the first flap 112. This helps reduce turbulence and drag during cruise. As illustrated in FIG. 1, the first flap support fairing 118 (and the associated flap support therein) and the first engine 108 are substantially laterally aligned along the first wing 104 (e.g., aligned along a same chord of the first wing 104). In some instances, having a flap support in this position is advantageous, as it may be the most optimal position for supporting the first flap 112. Further, having the first flap support fairing 118 (and the associated flap support) in line with the first engine 108 is a more aerodynamic configuration than having the first flap support fairing 118 and the first engine 108 spaced apart spanwise. However, when the first flap 112 is deployed, the first flap support fairing 118 is tilted downward into the plume of hot exhaust gas from the first engine 108. As such, with long flap support fairings, the flap support fairing may extend into the plume of the hot exhaust gas from the first engine 108.

Figure 2:
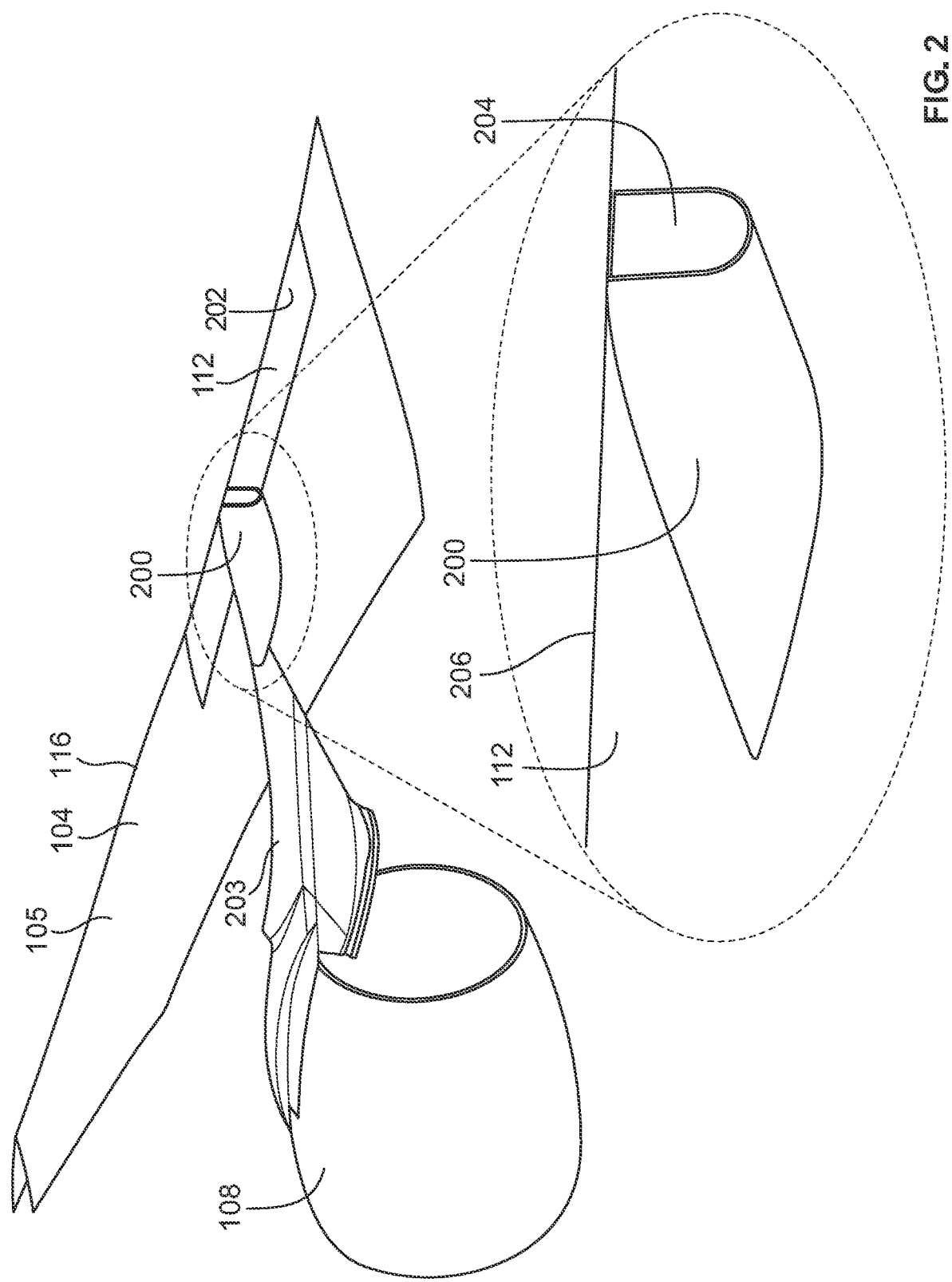
FIG. 2 is a bottom perspective view of an example wing of the example aircraft of FIG. 1 showing an example truncated flap support fairing on an example flap of the example wing.

FIG. 2 illustrates an example truncated flap support fairing 200 constructed in accordance with the teachings of this disclosure. FIG. 2 is an underside of the first wing 104. The example flap support fairing 200 can implemented in place of any of the example flap support fairings 118, 120, 122 on the aircraft of FIG. 1. In the examples disclosed herein, the flap support fairing 200 is described as being used in place of the first flap support fairing 118 associated with the first flap 112. However, it is understood that the example flap support fairing 200 can be similarly implemented in place of the second and/or third flap support fairings 120, 122 associated with the second flap 114.

In the illustrated example, the flap support fairing 200 is coupled to a bottom 202 of the first flap 112 and is moveable with the first flap 112 between the stowed position and the deployed position relative to the fixed wing portion 105. In the illustrated example, the flap support fairing 200 is substantially laterally aligned with the first engine 108 along the first wing 104 (e.g., the first engine 108 and the flap support fairing 200 are bisected by a vertical plane extending in the streamwise direction). In some examples, it is advantageous to locate the flap support fairing 200 (along with the internal flap support) in line with the first engine 108 because it produces a more aerodynamic configuration that reduces drag during cruise. Also, a fixed side of the flap support and/or the flap support fairing 200 can be coupled to and/or otherwise integrated with an engine pylon 203, which is more structurally efficient than having separate structures that are spaced part spanwise from each other along the first wing 104. Further, disposing the flap support fairing 200 (along with the internal flap support) in line with the first engine 108 is often a more central location on the first flap 112 and, thus, disposing the flap support in this location helps decrease bending of the first flap 112.

An enlarged view of the flap support fairing 200 in shown in the callout in FIG. 2. In the illustrated example, the flap support fairing 200 has an aft end 204, which may also be referred to as a trailing end. The flap support fairing 200 is truncated or shortened compared to known flap support fairings, such as the first flap support fairing 118 shown FIG. 1. As such, the flap support fairing 200 does not extend as far aft as the first flap support fairing 118. In the illustrated example, the aft end 204 is substantially flat or planar (e.g., a blunt end). In the illustrated example, the aft end 204 of the flap support fairing 200 is aligned with a trailing edge 206 of the first flap 112 (which may also be aligned with the trailing edge 116 of the first wing 104 when the first flap 112 is in the stowed position). However, in other examples, the flap support fairing 200 can be longer or shorter such that the aft end 204 of the flap support fairing 200 extends aft of the trailing edge 206 or is forward of the trailing edge 206.

FIG. 3 is a side view of the first flap 112 in the deployed position in which the first flap 112 has been tilted downward relative to the trailing edge 116 of the first wing 104. As shown in FIG. 3, the flap support fairing 200, which is coupled to the first flap 112, has been moved or tilted downward with the first flap 112. Because the flap support fairing 200 is truncated, less of the flap support fairing 200 extends into the exhaust plume than known elongated flap support fairings. In this example, only a small portion of the flap support fairing 200 is disposed in the exhaust plume. However, that small portion of the flap support fairing 200 is disposed closer to the edge or fringe of the exhaust plume where the heat and vibration is relatively lower and, thus, is less wearing on the flap support fairing 200. In particular, the exhaust plume's velocity and temperature is a gradient that is generally highest at the center line and lower as the radial distance increases. In other examples, the flap support fairing 200 can be shortened even more such that when the first flap 112 is in the deployed position, none of the flap support fairing 200 is disposed in the exhaust plume.

Because the flap support fairing 200 is truncated, the flap support fairing 200 may result in more turbulence and drag than an elongated tapering flap support fairing. However, the example flap support fairing 200 can include an example active flow control system to reduce this turbulence and drag, as disclosed in further detail herein.

FIG. 4 is an isolated perspective view of the aft end 204 of the example flap support fairing 200. To reduce drag caused by the truncated aft end 204, the example aircraft 100 includes an active flow control system 400. The active flow control system 400 can be at least partially integrated into and/or coupled to the flap support fairing 200. The example active flow control system 400 includes one or more nozzles (which may also be referred to as jets or outlets) that eject high velocity air in the streamwise direction from the aft end 204 of the flap support fairing 200. In this example, the active flow control system 400 includes twelve nozzles 402a-402l. The nozzles 402a-402l eject high velocity air in the streamwise direction, as shown by the arrows.

Figure 5B:
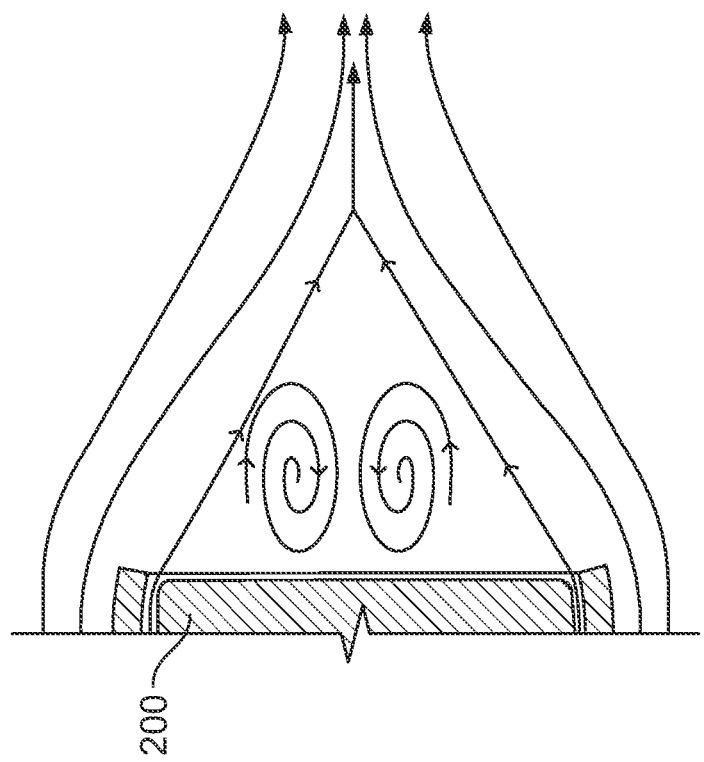
FIG. 5B shows enhanced air flow lines around the aft end of the example flap support fairing when using the example active flow control system.
Figure 5A:
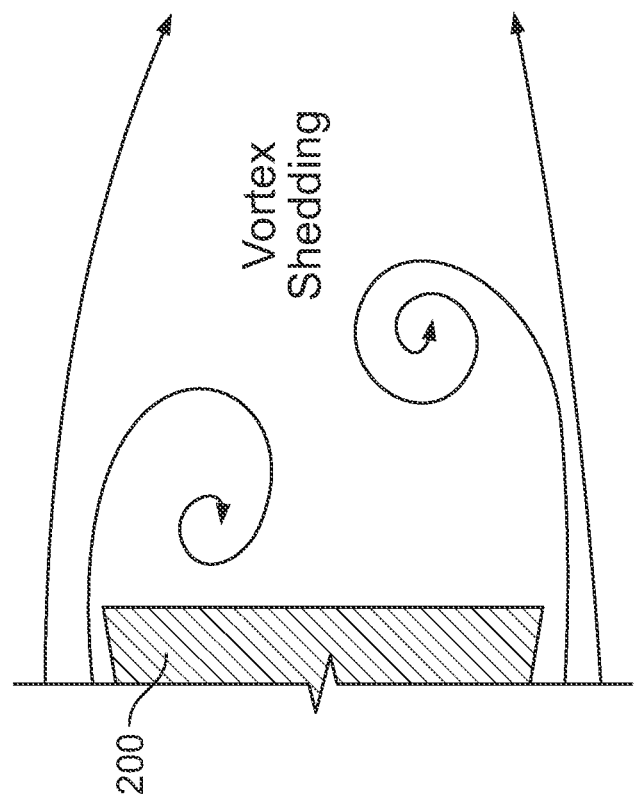
FIG. 5A shows turbulent air flow lines around the aft end of the example truncated flap support fairing when not using the example active flow control system.

Referring briefly to FIGS. 5A and 5B, FIG. 5A shows an example of the airflow around the flap support fairing 200 when not using the active flow control system 400 and FIG. 5B shows the airflow around the flap support fairing 200 when using of the active flow control system 400. As shown in FIG. 5A, the truncated design of the flap support fairing 200 can result in a low-pressure area behind the aft end 204 that causes the airflow to separate. This low-pressure, separated flow aft of the truncated fairing produces aerodynamic drag. However, as shown in FIG. 5B, by ejecting high velocity air in the streamwise direction, the flow around the sides of the flap support fairing 200 is prevented from becoming entrained behind the blunt end of the fairing and causing separated flow by the active flow control system 400, thereby reducing drag caused by the truncated design. Therefore, the active flow control system 400 improves fuel efficiency.

Referring back to FIG. 4, in the illustrated example, the flap support fairing 200 includes a side wall 404 and a bulkhead 406 coupled to the side wall 404 (e.g., at the aft or trailing edge of the side wall 404). The side wall 404 is U- or C-shaped. The bulkhead 406 defines or forms the aft end 204 of the flap support fairing 200. The bulkhead 406 can be a plate or wall, for example. The side wall 404 and the bulkhead 406 form a cavity in which the flap support mechanism is disposed.

In the illustrated example, the nozzles 402a-402l extend through the bulkhead 406. In this example, the nozzles 402a-402l have rectangular shaped outlets. The outlets or the nozzles 402a-402l are aligned with or disposed in corresponding slots or openings in the bulkhead 406. The nozzles 402a-402l eject the high velocity air in the streamwise direction from the bulkhead 406. In the illustrated example, the nozzles 402a-402l are arranged along a perimeter or edge of the bulkhead 406, adjacent the side wall 404. This is the location where the airflow separation occurs. Therefore, ejecting the high velocity air along or close the side wall 404 helps reduce air flow separation. Additionally or alternatively, one or more nozzles can be located inward of the nozzles 402a-402l shown in FIG. 4.

While in this example the active flow control system 400 includes twelve nozzles 402a-402l, in other examples, the active flow control system 400 can include more or fewer nozzles. For example, the active flow control system 400 can include one nozzle. In other examples, the active flow control system 400 can include two nozzles, three nozzles, etc. Thus, when describing the nozzles 402a-402l, it is understood that any number of nozzles can be used.

In some examples, each of the nozzles 402a-402l has the same size outlet. In other examples, certain ones of the nozzles 402a-402l can be larger or smaller than other ones of the nozzles 402a-402l. In some examples, the nozzles 402a-402l are disposed adjacent each other to form a substantially continuous curtain of air around the perimeter of the bulkhead 406. However, in other examples, the nozzles 402a-402l can be spaced from each other (e.g., spaced equidistant from each other). In some examples, instead of using a plurality of separate nozzles, one larger nozzle can be implemented that has a shape or profile matching the curvature of the bulkhead 406.

In some examples, the air ejected from the nozzles 402a-402l is substantially the same velocity as the airflow around the flap support fairing 200. For example, the active flow control system 400 can determine the speed of the airflow around the flap support fairing 200 and can adjust the speed of the pressurized air exiting the nozzles 402a-402l. In other examples, air ejected from the nozzles 402a-402l can have higher velocity or a lower velocity than the velocity of the airflow around the flap support fairing 200.

FIGS. 6A-6C are different views of the bulkhead 406. The bulkhead 406 is shown as transparent in order to expose the nozzle(s). In FIGS. 6A-6C, only the first nozzle 402a is shown. However, it is understood that the other nozzles 402b-402l are similarly incorporated into the bulkhead 406 as the first nozzle 402a. Therefore, any of the structural or functional aspects disclosed in connection with the first nozzles 402a can likewise apply to the other nozzles 402b-402l.

As shown in FIG. 6A, the first nozzle 402a extends through the bulkhead 406 from a front-facing side 600 of the bulkhead 406 to a rear-facing side 602 of the bulkhead 406. The first nozzle 402a can be embedded in and/or otherwise coupled (e.g., via friction fit, via an adhesive, etc.) to the bulkhead 406. The first nozzle 402a has an inlet 604 and an outlet 606. The active flow control system 400 supplies pressurized air to the inlet 604 of the first nozzle 402a, which is ejected out of the outlet 606. In some examples, the first nozzle 402a is shaped to increase the speed or velocity of the air between the inlet 604 and the outlet 606. In this example, the first nozzle 402a is a converging nozzle. In other examples, the first nozzle 402a can be implemented as a converging-diverging nozzle.

In some examples, the active flow control system 400 includes a manifold 608. The manifold 608 can be coupled to and/or disposed adjacent the front-facing side 600 of the bulkhead 406. In this example, the manifold 608 receives high pressure air from a supply line 610 and distributes the high pressure air to the nozzles 402a-402l. For example, a first hose 612 is coupled between the manifold 608 and the first nozzle 402a. Multiple hoses may extend from the manifold 608 to the various nozzles. In some examples, the high pressure air is bleed air from an engine for the aircraft 100 (e.g. the first engine 108). In such an example, the supply line 610 is operatively coupled to receive bleed air from an engine of the aircraft 100. Additionally or alternatively, the high pressure air can be generated by a pump or compressor on the aircraft 100. For example, a pump or compressor can be incorporated into the manifold 608.

FIGS. 6B and 6C show the first nozzle 402a as extending through and/or embedded in the bulkhead 406. The outlet 606 is aligned with the rear-facing side 602. In this example, the outlet 606 of the first nozzle 402a has a flattened elongated shape (e.g., a rectangle). However, in other examples, the outlet 606 can be shaped differently.

Figure 7:
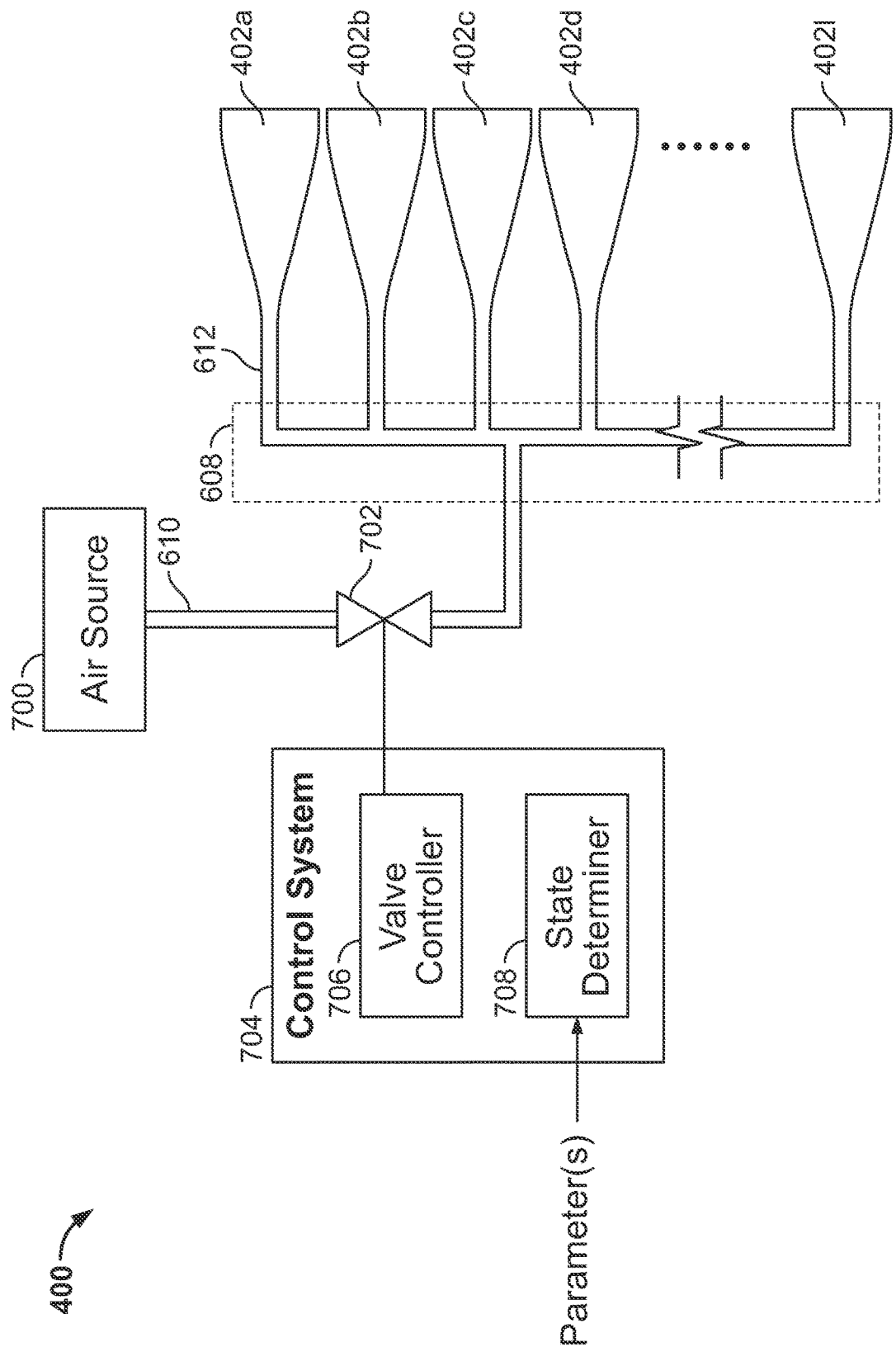
FIG. 7 is a schematic of the example active flow control system of FIG. 4.

FIG. 7 is a schematic of the example active flow control system 400. In the illustrated example, a high pressure air source 700 (e.g., an air supply, a pressurized air source, etc.) provides high pressure air to the nozzles 402a-402l via the supply line 610, the manifold 608, and the hoses 612 (one of which is referenced in FIG. 7). In other examples, other types of piping systems can be utilized to route the pressurized air to the nozzles 402a-402l. In some examples, the high pressure air source 700 is bleed air extracted from one or more of the engines of the aircraft 100 (FIG. 1). Additionally or alternatively, in some examples, the high pressure air source 700 includes one or more pumps, compressors, pressure storage vessels (e.g., an air tank), and/or APUs.

In some examples, the active flow control system 400 includes a valve 702. The valve 702 can be opened or closed to control when the high pressure air supplied to the nozzles 402a-402l (e.g., to activate the nozzles 402a-402l or deactivate the nozzles 402a-402l). In some examples, the valve 702 is a pressure-reducing shut-off valve, which can be used to regulate the pressure of the high pressure air supplied to the nozzles 402a-402l.

In the illustrated example, the active flow control system 400 includes a control system 704 to control the pressurized air supplied to the nozzles 402a-402l and, thus, control the high velocity air ejected from the nozzles 402a-402l. The control system 704 can be implemented by the processor 912 disclosed in further detail in connection with FIG. 9. The control system 704 includes or implements a valve controller 706 and a state determiner 708. The valve controller 706 controls the state of the valve 702 (e.g., between an open position and a close position), thereby activating or deactivating the nozzles 402a-402l. The valve controller 706 can also control the valve 702 to regulate the pressure or flow of the high pressure air to the nozzles 402a-402l. The state determiner 708 can determine the state or segment of flight of the aircraft 100 and/or other states of one or more components of the aircraft.

In some examples, the control system 704 determines whether to activate the nozzles 402a-402l based on the segment of flight as determined by the state determiner 708. For example, the state determiner 708 receives one or more parameters from the aircraft 100 (e.g., via one or more sensors) and determines the segment of flight based on the parameter(s). The parameter(s) may include, for example, an ambient air temperature, an altitude of the aircraft 100 (FIG. 1), a ground speed of the aircraft 100, a relative airspeed of the aircraft 100, an angle or position of the associated control surface (e.g., the first flap 112 (FIG. 1)), a weather condition and/or any other flight setting or control surface setting. In some examples, the state determiner 708 can determine if the aircraft 100 is in one of a plurality of segments of flight, such as take-off, cruise, descent, or landing. In some examples, the nozzles 402a-402l are activated (e.g., by opening the valve 702) during one or more of the states. For example, it may be desirable to activate the nozzles 402a-402l during cruise to reduce drag and improve fuel efficiency. Therefore, if the state determiner 708 determines the aircraft 100 is in a cruise segment of flight, the valve controller 706 can open the valve 702 (or keep the valve 702 in an open position) to supply pressurized air to the nozzles 402a-402l. In some examples, the valve controller 706 can control the valve 702 to regulate the pressure to a desired pressurize to control the velocity of the air ejected from the nozzles 402a-402l. In some examples, it may be desirable to deactivate the nozzles 402a-402l during certain segments of flight. For example, during take-off and landing the active flow may have minimal affect because the flaps are deployed. Therefore, if the state determiner 708 determines the aircraft 100 is taking off or landing, the valve controller 706 can close the valve 702 (or keep the valve 702 in a closed position) to cease supplying high pressure air to the nozzles 402a-402l.

Additionally or alternatively, the control system 704 can activate or deactivate the nozzles 402a-402l based on or more other factors. For example, it may be desirable to activate the nozzles 402a-402l when the first flap 112 is in the stowed position, and deactivate the nozzles 402a-402l when the first flap 112 is not in the stowed position. The state determiner 708 can determine the position of the first flap 112 (e.g., based on input from a position sensor) and the valve controller 706 can open or close the valve 702 based on the determined position of the first flap 112. In other examples, the nozzles 402a-402l can be activated during the entire flight. Therefore, the valve 702 can be removed or can be left in the open position during the entire flight.

While an example manner of implementing the control system 704 is illustrated in FIG. 7, one or more of the elements, processes and/or devices illustrated in FIG. 7 may be combined, divided, re-arranged, omitted, eliminated and/or implemented in any other way. Further, the example valve controller 706, the example state determiner 708, and/or, more generally, the example control system 704 of FIG. 7 may be implemented by hardware, software, firmware and/or any combination of hardware, software and/or firmware. Thus, for example, any of the example valve controller 704, the example state determiner and/or, more generally, the example control system 704 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example valve controller 706 and/or the example state determiner 708 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control system 704 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
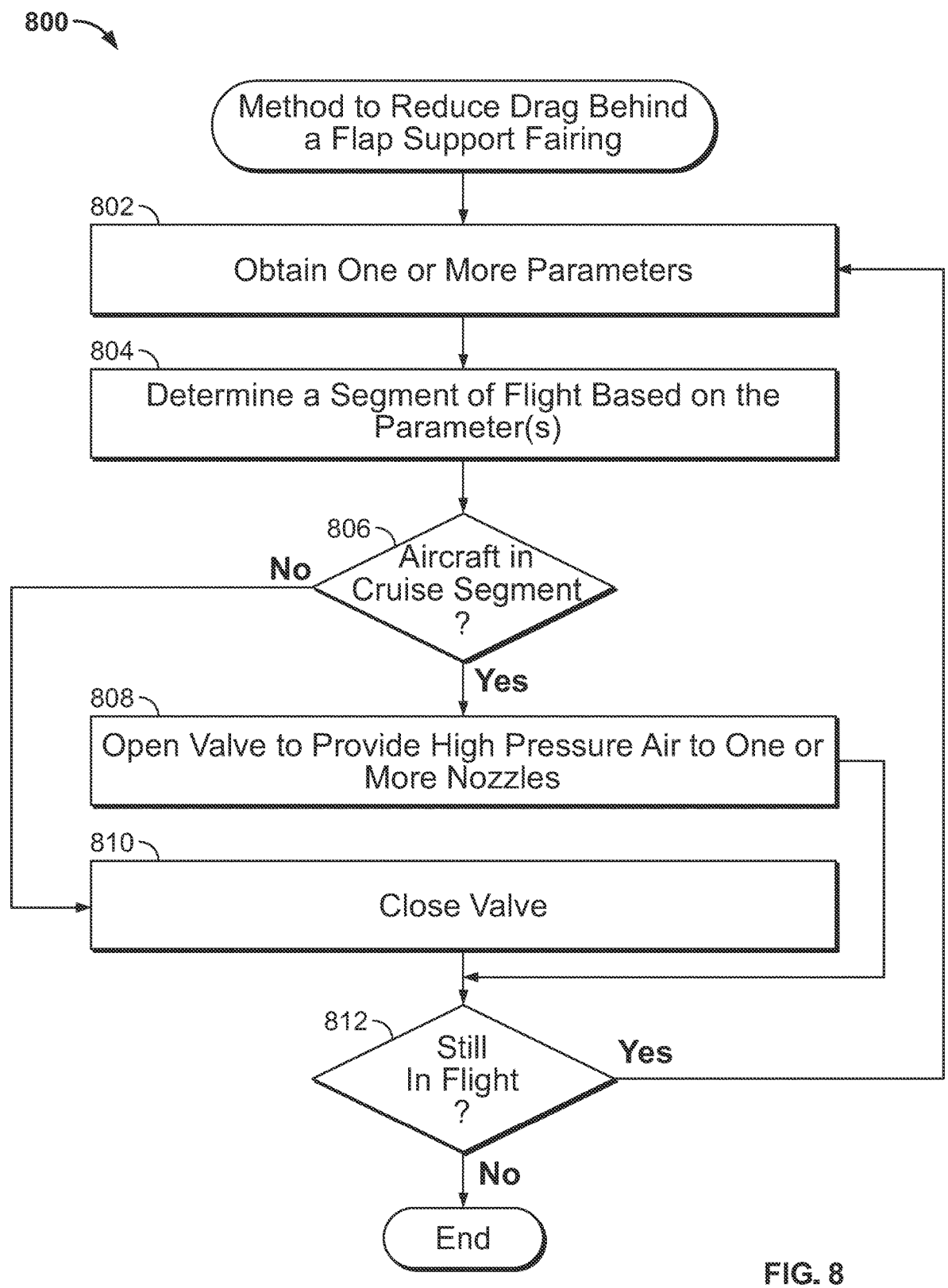
FIG. 8 a flowchart representative of machine readable instructions that may be executed to implement an example control system of the example active flow control system of FIG. 7.

A flowchart representative of example hardware logic, machine readable instructions, hardware implemented state machines, and/or any combination thereof for implementing the control system 704 of FIG. 7 is shown in FIG. 8. The machine readable instructions may be one or more executable programs or portion(s) of an executable program for execution by a computer processor and/or processor circuitry, such as the processor 1012 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example control system 704 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B.

Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of an example method 800 to reduce drag behind a flap support fairing as implemented by the example active flow control system 400 of FIG. 7. The example method 800 may be implemented, at least in part, as machine readable instructions to implement the control system 704.

At block 802, the state determiner 708 obtains one or more parameters. The parameter(s) may include, for example, an ambient air temperature, an altitude of the aircraft 100 (FIG. 1), a ground speed of the aircraft 100, a relative airspeed of the aircraft 100, an angle or position of the associated control surface (e.g., the first flap 112 (FIG. 1)), a weather condition and/or any other flight setting or control surface setting. At block 804, the state determiner 708 determines a segment of flight of the aircraft 100 based on the parameter(s). For example, the state determiner 708 may determine whether the aircraft 100 is taking off, at cruise, descending, or landing.

At block 806, the state determiner 708 determines whether the aircraft 100 in a cruise segment of flight. If the state determiner 708 determines the aircraft 100 is in the cruise segment of flight, the valve controller 706, at block 808, opens the valve 702 (or maintains the valve 702 in an open position) to supply high pressure air to the nozzles 402a-402l. As such, the nozzles 402a-402l eject the high pressure air as high velocity air in the streamwise direction from the aft end 204 of the flap support fairing 200. This reduces drag caused by the truncated design of the flap support fairing 200 and, thus, improves the fuel efficiency of the aircraft 100 during the cruise segment of flight.

If the state determiner 708 determines the aircraft 100 is not in the cruise segment of flight, such as if the state determiner 708 determines the aircraft 100 is in a takeoff or landing segment of flight, the valve controller 706 closes the valve 702 (or maintains the valve 702 in the close position). This ceases the supply of high pressure air to the nozzles 402a-402l.

At block 812, the state determiner 708 determines if the aircraft 100 is still in flight. If the aircraft 100 is not in flight, the example method 800 may end. If the aircraft 100 is still in flight, control proceeds back to block 802 and the example method 800 can be repeated. As such, the example method 800 continuously monitors the segment of flight and controls the nozzles 402a-402l based on the segment.

In other examples, the nozzles 402a-402l can be activated or deactivated during other segments of flight. For example, in some instances, it may be desirable to active the nozzles 402a-402l during take-off and/or landing. In some examples, the nozzles 402a-402l can be activated or deactivated based on or more other factors. For example, the nozzles 402a-402l can be activated when the first flap 112 is in the stowed position and deactivated when the first flap 112 is moved to the deployed position.

Figure 9:
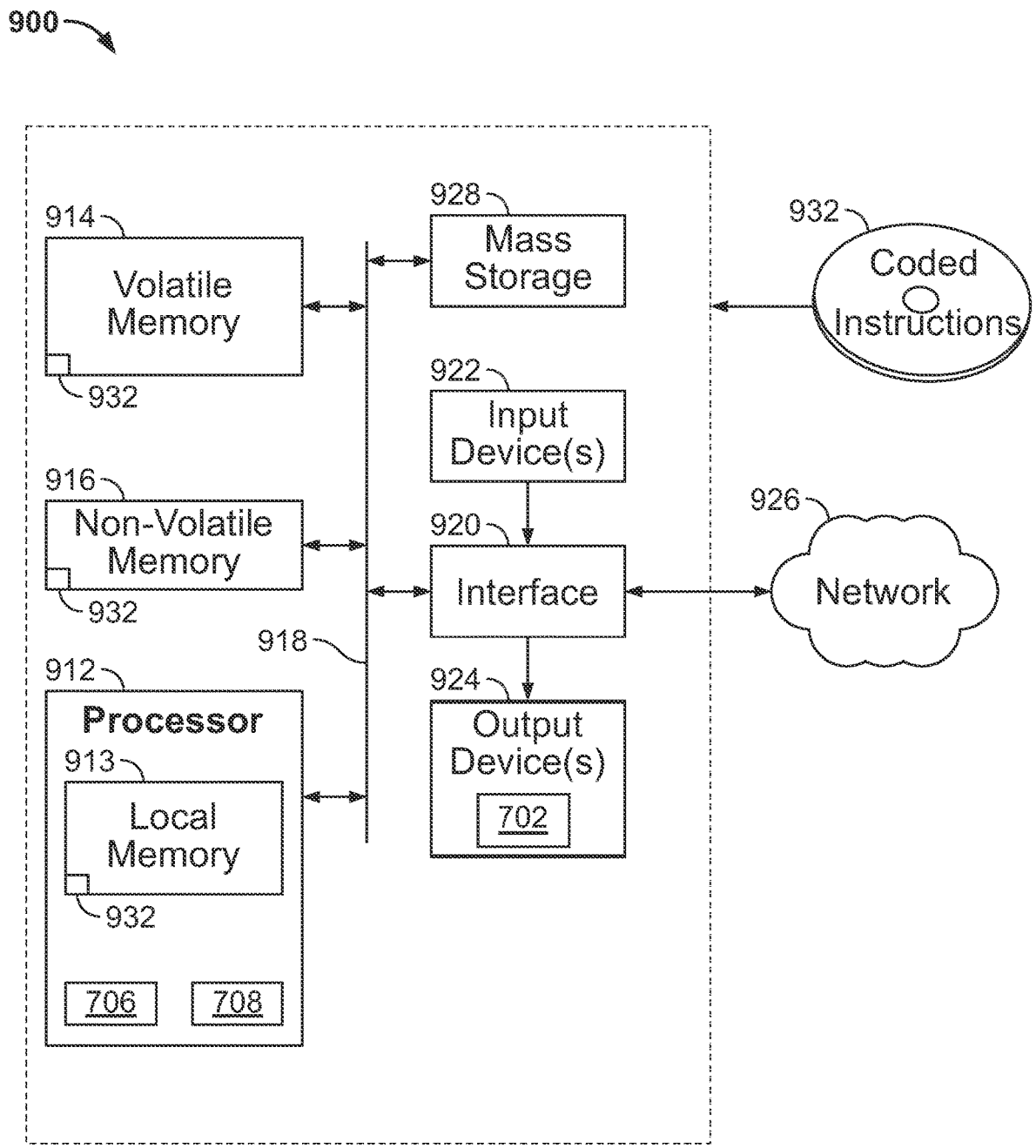
FIG. 9 is a block diagram of an example processing platform structured to execute the instructions of FIG. 3 to implement the example control system.

FIG. 9 is a block diagram of an example processor platform 900 structured to execute the instructions of FIG. 8 to implement the control system 704 of FIG. 7. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example valve controller 706 and the example state determiner 708.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a device and/or a user to enter data and/or commands into the processor 912. The input device(s) can be implemented by, for example, one or more sensor(s) on the aircraft 100, an audio sensor, a microphone, a camera (still or video), a keyboard, a button, a mouse, a touchscreen, a track-pad, a trackball, isopoint and/or a voice recognition system.

One or more output device(s) 924 are also connected to the interface circuit 920 of the illustrated example. In some examples, the output device(s) 924 include the valve 702. Additionally or alternatively, the output device(s) 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus, systems, and articles of manufacture have been disclosed that can reduce drag from a truncated flap support fairing of an aircraft. By reducing drag, the flap support fairing can be shortened, which enables the flap support fairing to be positioned directly behind the engine but not extend into (or not extend significantly into) the engine exhaust plume. Thus, the examples disclosed herein enable the flap support and flap support fairing to be positioned in a desirable location along the wing of the aircraft. Further, shorter flap support fairings are beneficial on drooping flap to prevent the flap support fairing from contacting the runway during landing or takeoff and/or other obstacles. Therefore, the example disclosed herein enable the use of a shorter flap support fairing without penalizing high speed performance and fuel efficiency.

Example methods, systems, apparatus, and articles of manufacture for reducing drag caused by a truncated flap support fairing have been disclosed. The following paragraphs provide various examples and example combinations of the examples disclosed herein.

Example 1 is an aircraft comprising a wing having a fixed wing portion, a flap moveably coupled to the fixed wing portion, a flap support fairing coupled to a bottom of the flap, the flap support fairing having an aft end, and an active flow control system including a nozzle. The nozzle is to eject high velocity air in a streamwise direction from the aft end of the flap support fairing.

Example 2 includes the aircraft of Example 1, wherein the active flow control system includes a plurality of nozzles to eject the high velocity air in the streamwise direction.

Example 3 includes the aircraft of Example 2, wherein the plurality of nozzles are arranged along a perimeter of the aft end.

Example 4 includes the aircraft of Examples 2 or 3, wherein the active flow control system includes a manifold to distribute high pressure air to the plurality of nozzles.

Example 5 includes the aircraft of any of Examples 1-4, wherein the aft end of the flap support fairing is aligned with a trailing edge of the flap.

Example 6 includes the aircraft of any of Examples 1-5, further including an engine coupled to the wing, wherein the flap support fairing and the engine are substantially laterally aligned along the wing.

Example 7 includes the aircraft of any of Example 1-6, wherein the flap support fairing includes a bulkhead that defines the aft end of the flap support fairing.

Example 8 includes the aircraft of Example 7, wherein the nozzle is coupled to the bulkhead.

Example 9 includes the aircraft of Example 8, wherein the nozzle extends through the bulkhead, such that an outlet of the nozzle is aligned with a rear-facing side of the bulkhead.

Example 10 includes the aircraft of Example 9, wherein the outlet of the nozzle has a flattened elongated shape.

Example 11 includes the aircraft of any of Examples 1-10, wherein the active flow control system includes a valve between a high pressure air source and the nozzle.

Example 12 includes the aircraft of Example 11, wherein the high pressure air source is bleed air from an engine of the aircraft.

Example 13 is a flap support fairing for an aircraft. The flap support fairing comprises a side wall, a bulkhead coupled to the side wall, the bulkhead defining an aft end of the flap support fairing, and a nozzle coupled to the bulkhead. The nozzle is to eject high velocity air in a streamwise direction from the bulkhead.

Example 14 includes the flap support fairing of Example 13, further including a plurality of nozzles coupled to the bulkhead.

Example 15 includes the flap support fairing of Example 14, wherein the plurality of nozzles are arranged along a perimeter of the bulkhead.

Example 16 includes the flap support fairing of Examples 14 or 15, further including a manifold to distribute high pressure air to the plurality of nozzles.

Example 17 is a method comprising determining an aircraft is in a cruise segment of flight and, in response to determining the aircraft in the cruise segment of the flight, opening a valve to supply high pressure air to a nozzle. The nozzle is to eject high velocity air in a streamwise direction from an aft end of a flap support fairing to reduce drag.

Example 18 includes the method of Example 17, further including determining the aircraft is in a takeoff or landing segment of the flight and, in response to determining the aircraft is in the takeoff or landing segment of the flight, closing the valve.

Example 19 includes the method of Examples 17 or 18, wherein the valve is between a high pressure air source and the nozzle.

Example 20 includes the method of Example 19, wherein the high pressure air source is bleed air from an engine of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
a wing having a fixed wing portion;
a flap moveably coupled to the fixed wing portion;
a flap support fairing positioned on a bottom surface of an aft portion of the wing and positioned below a bottom of the flap to support the bottom of the flap, the flap support fairing having nozzles arranged along a periphery of an aft end of the flap support fairing; and
an active flow control system fluidly coupled to the nozzles of the flap support fairing, the nozzles to eject air to flow along a streamwise direction from the aft end of the flap support fairing.

2. The aircraft of claim 1, wherein the active flow control system includes a manifold to distribute air to the nozzles.

3. The aircraft of claim 1, wherein the aft end of the flap support fairing is aligned with a trailing edge of the flap.

4. The aircraft of claim 1, further including an engine coupled to the wing, wherein the flap support fairing and the engine are laterally aligned along the wing.

5. The aircraft of claim 1, wherein the flap support fairing includes a bulkhead that defines the aft end of the flap support fairing.

6. The aircraft of claim 5, wherein the nozzles are coupled to the bulkhead.

7. The aircraft of claim 6, wherein the the nozzles extend through the bulkhead, such that outlets of the nozzles are aligned with a rear-facing side of the bulkhead.

8. The aircraft of claim 7, wherein the outlets of the nozzles have a flattened elongated shape.

9. The aircraft of claim 1, wherein the active flow control system includes a valve between an air source and the nozzles.

10. The aircraft of claim 9, wherein the air source is to supply bleed air from an engine of the aircraft to the nozzles.

11. A flap support fairing for an aircraft, the flap support fairing comprising:
a side wall to be positioned on a bottom surface of an aft portion of a wing and positioned below a bottom of a flap to support the bottom of the flap;
a bulkhead coupled to the side wall, the bulkhead defining an aft end of the flap support fairing; and
a nozzles of the flap support fairing, the nozzles arranged along a periphery of the bulkhead, the nozzles to eject air to flow along a streamwise direction from the bulkhead.

12. The flap support fairing of claim 11, further including a manifold to distribute air to the nozzles.

13. A method comprising:
determining an aircraft is in a cruise segment of flight; and
in response to determining the aircraft is in the cruise segment of the flight, opening a valve to supply air to nozzles of a flap support fairing, the flap support fairing positioned on an underside of an aft portion of a wing of the aircraft and positioned below a bottom of the flap to support the bottom of the flap, nozzles arranged along a periphery of an aft end of the flap support fairing, the nozzles to eject air to flow along a streamwise direction from the aft end of the flap support fairing to reduce drag.

14. The method of claim 13, further including:
determining the aircraft is in a takeoff or landing segment of the flight; and
in response to determining the aircraft is in the takeoff or landing segment of the flight, closing the valve.

15. The method of claim 13, wherein the valve is between an air source and the nozzles.

16. The method of claim 15, wherein the air source is to supply bleed air from an engine of the aircraft to the nozzles.

17. The aircraft of claim 1, wherein the flap support fairing is moveable with the flap.

18. The aircraft of claim 1, wherein the nozzles are converging nozzles.

* * * * *

UNITED STATES PATENT AND TRADEMARK OFFICE
CERTIFICATE OF CORRECTION

PATENT NO. : 12,024,287 B2
APPLICATION NO. : 17/693006
DATED : July 2, 2024
INVENTOR(S) : Tsai et al.

Page 1 of 1

It is certified that error appears in the above-identified patent and that said Letters Patent is hereby corrected as shown below:

In the Claims

Column 17, Claim 7 Line 26, Delete "wherein the the nozzles extend" and insert --wherein the nozzles extend--.

Signed and Sealed this
Tenth Day of September, 2024

Katherine Kelly Vidal
*Director of the United States Patent and Trademark Office*